United States Patent
Baldwin

(10) Patent No.: US 8,534,703 B1
(45) Date of Patent: Sep. 17, 2013

(54) DYNAMIC ANTIWHIPLASH APPARATUS AND METHOD

(75) Inventor: Michael John Baldwin, Sunnyvale, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

(21) Appl. No.: 13/417,195

(22) Filed: Mar. 9, 2012

(51) Int. Cl.
*B60R 21/16* (2006.01)
*B60N 2/42* (2006.01)

(52) U.S. Cl.
USPC .............. 280/730.2; 297/216.12; 297/216.13; 297/216.14

(58) Field of Classification Search
USPC ......... 280/730.1, 730.2; 297/216.12, 216.13, 297/216.14
See application file for complete search history.

(56) References Cited

U.S. PATENT DOCUMENTS

| 5,496,061 | A | * | 3/1996 | Brown | 280/730.2 |
| 5,911,433 | A | * | 6/1999 | Swann | 280/730.2 |
| 6,095,550 | A | * | 8/2000 | O'Loughlin et al. | 280/730.1 |
| 6,196,576 | B1 | * | 3/2001 | Sutherland et al. | 280/730.1 |
| 7,523,957 | B2 | * | 4/2009 | Palm | 280/730.1 |
| 7,695,015 | B2 | * | 4/2010 | Breed | 280/751 |
| 7,922,190 | B2 | * | 4/2011 | Sugimoto et al. | 280/729 |
| 2001/0009327 | A1 | * | 7/2001 | Zeigler | 280/735 |
| 2009/0200774 | A1 | * | 8/2009 | Nam et al. | 280/730.2 |

* cited by examiner

*Primary Examiner* — Toan To
(74) *Attorney, Agent, or Firm* — J. Richard Soderberg

(57) ABSTRACT

A passenger seat protection system for a seated passenger of a vehicle includes a seat back supporting a pressurizable vessel storing a quantity of pressurized gas within a compartment, the compartment defined by one or more walls that collapse responsive to a force applied to the seat back by the seated passenger in a rear impact of the vehicle; a headrest including a bladder responsive to a gas pressure from the quantity of pressurized gas to transition an expansion of the headrest from a first expansion mode to a second expansion mode; and a gas channel communicating the quantity of pressurized gas to the bladder after a collapsing of the one or more walls.

13 Claims, 2 Drawing Sheets

DYNAMIC ANTIWHIPLASH APPARATUS AND METHOD

BACKGROUND OF THE INVENTION

The present invention relates generally to passenger vehicle collision protection, and more particularly but not exclusively, to antiwhiplash systems and methods reducing risks of injury due to rear end impacts.

Whiplash generally refers to neck injuries associated with cervical acceleration-deceleration of a motor vehicle passenger in the context of rear-end collisions. Specifically, as the vehicle is hit from behind, forces from the seat back compress the kyphosis of the thoracic spine which in turn axial loads the lumbar spine and the cervical spine. This loading deforms the cervical spine into an S-shape where the lower cervical spine is forced into a kyphosis while the upper cervical spine maintains a lordosis. For serious injuries, the whole cervical spine becomes hyper-extended.

The Insurance Institute for Highway Safety (IIHS) has reported that approximately 2 million whiplash insurance claims are filed each year in the United States, resulting in more than $8.5 billion in insurance claims. Neck sprains and strains are the most frequent type of injury claim reported to insurance companies in the United States, comprising 25% of all injury-related claim dollars paid out by insurers each year. The institute also reported that about 10% of whiplash injuries result in long-term medical problems. Thus the economic cost alone is high without regard to physical pain and impairments, particularly considering that not all injuries are claimed and directly counted.

Conventional primary solutions include use of properly adjusted headrests and properly angled seats. One solution includes use of a lever mechanism to mechanically adjust a headrest. The seat includes the lever that responds to a passenger being forced back into the seat by rotating about a pivot that in turn adjusts the headrest forward. A relatively complicated system that has limits to its adjustability and scalability while adding costs.

While certain types of passenger safety systems are used for other impacts (e.g., high pressure airbags for front and side collisions) they are not suitable for rear end collision as such devices could actually cause or exacerbate the very injury to be protected against. This is due to the relatively high deployment speeds and pressures arising from detonation of such airbags.

What is needed is an apparatus and method for simply and efficiently reducing whiplash injuries that could result from a rear end impact to a passenger vehicle.

BRIEF SUMMARY OF THE INVENTION

Disclosed is an apparatus and method simply and efficiently reducing whiplash injuries that could result from a rear end impact to a passenger vehicle. The following is not a complete technical discussion of all embodiments of passenger seat protection systems and methods of the present invention but provide a description and overview of the making and using of exemplary embodiments.

A passenger seat protection system for a seated passenger of a vehicle includes a seat back supporting a pressurizable vessel storing a quantity of pressurized gas within a compartment, the compartment defined by one or more walls that collapse responsive to a force applied to the seat back by the seated passenger in a rear impact of the vehicle; a headrest including a bladder responsive to a gas pressure from the quantity of pressurized gas to transition an expansion of the headrest from a first expansion mode to a second expansion mode; and a gas channel communicating the quantity of pressurized gas to the bladder after a collapsing of the one or more walls.

A passenger protection method for a seated passenger of a vehicle includes: a) collapsing a compartment in a pressurizable vessel supported by a seat back responsive to a force applied to the seat back by the seated passenger in a rear impact of the vehicle wherein the compartment includes a quantity of pressurized gas; thereafter b) communicating the quantity of pressurized gas to a bladder disposed in a headrest coupled to the seat back; and thereafter c) expanding the bladder responsive to the quantity of pressurized gas communicated from the collapsed compartment.

Features/benefits include a simple, reliable, and effective protection system and method that does not require sensors, electronics, or complex moving parts. The solutions are scalable and adaptable to many different passenger seat systems. Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Embodiments of the present invention provide an apparatus and method simply and efficiently reducing whiplash injuries that could result from a rear end impact to a passenger vehicle. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
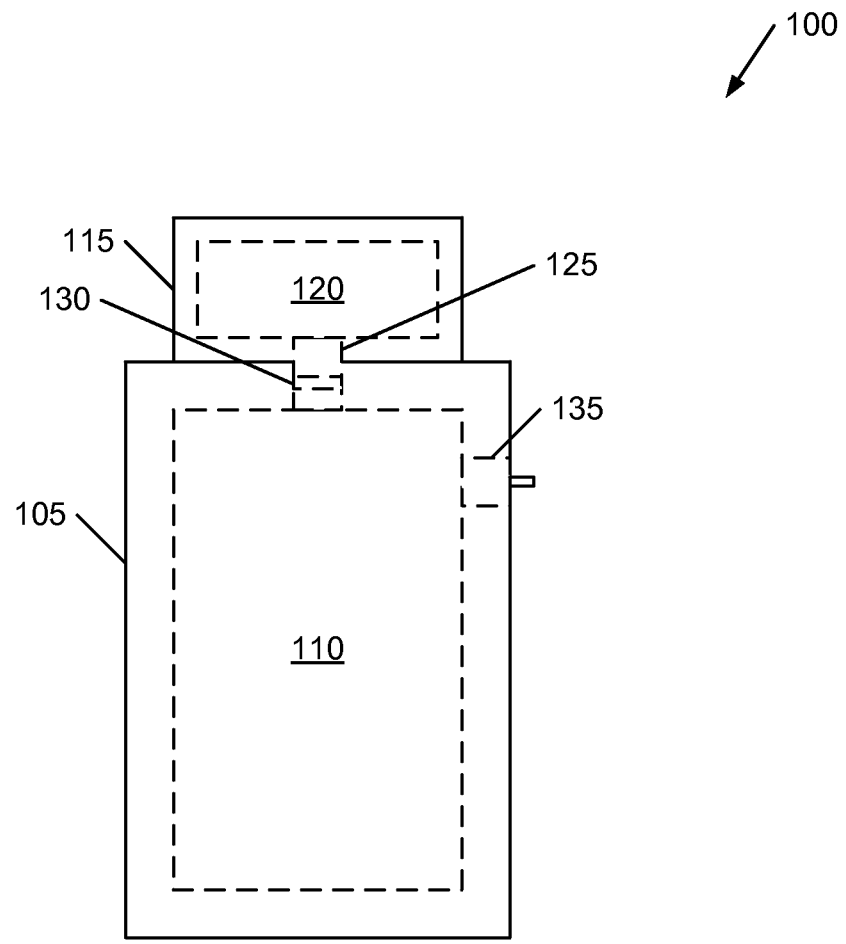
FIG. 1 illustrates a schematic block diagram of a front view of a passenger protection system for a passenger of a vehicle.
Figure 2:
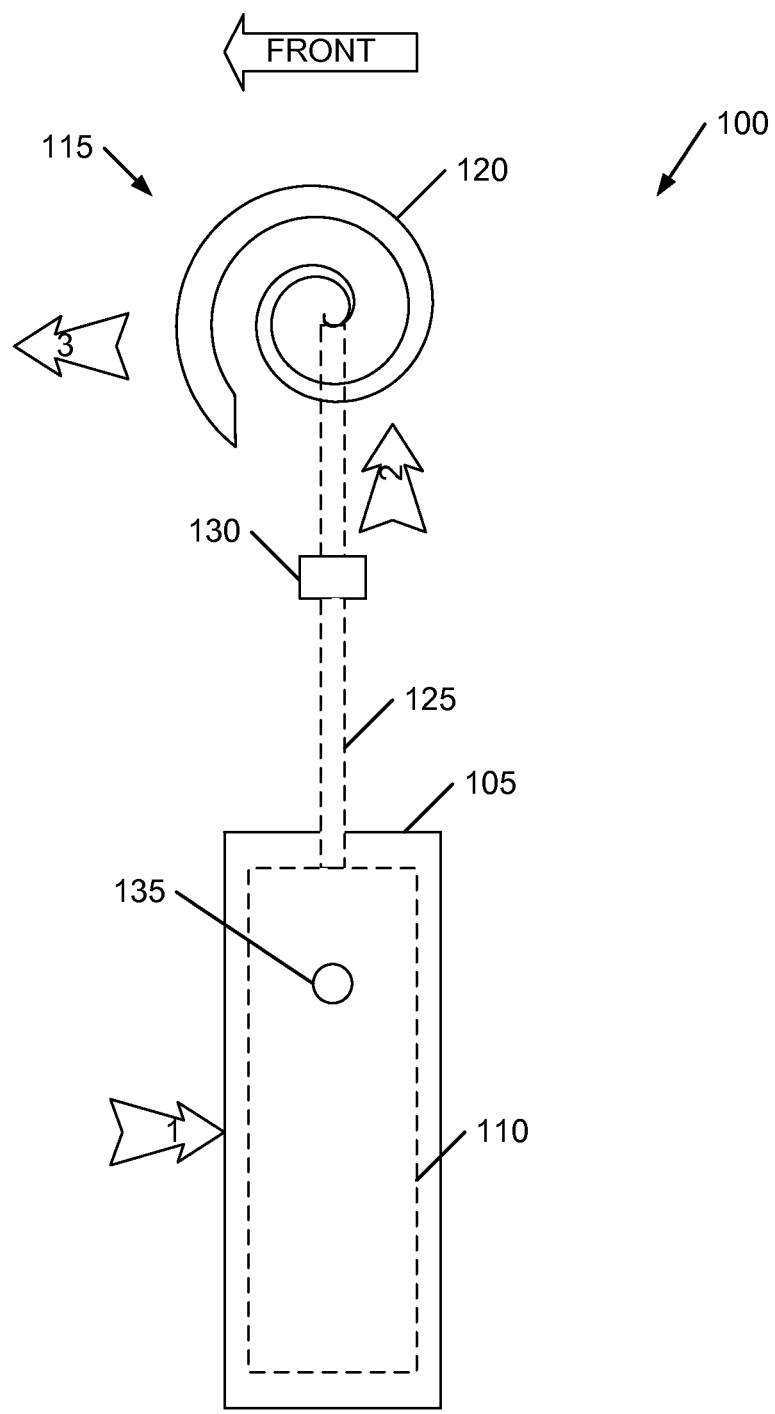
FIG. 2 illustrates a schematic block diagram of a side view of the passenger protection system for the passenger of the vehicle.

FIG. 1 illustrates a schematic block diagram of a front view of a passenger protection system 100 for a passenger of a vehicle; and FIG. 2 illustrates a schematic block diagram of a side view of passenger protection system 100. The passenger protection system 100 includes embodiments for reduction of both injury and attendant costs associated with whiplash and the like. Preferred embodiments use beverage can type technology to provide a passenger seat back 105 with a thin walled pressure compartment 110 containing a quantity of pressurized gas. Compartment 110 may be an independent construct or a feature integrated into seat back 105. Embodiments in which compartment 110 is independent enable compartment replacement (as opposed to seat back replacement)

in the event that the protection mechanism is actuated and can therefore be more economical.

Similar to beverage cans, sidewalls of compartment 110 are enabled to be very relatively thin with thicker walled structural end caps (e.g., tops and bottoms of compartment 110). The sidewalls may be made of steel, aluminum, or other suitable materials. Even with thin sidewalls, compartment 110 provides rigid structural support to the passenger due to the pressurized gas within, which is also another structural feature of beverage can technology. The unloaded pressure of the pressurized gas is adjusted based upon application and implementation details. In the preferred embodiment, pneumatic deployment is implemented using a low pressure, in the range of 2-10 bar (30-150 psi) which is in contrast to about 200 bar (3000 psi) for standard airbags when detonated.

A headrest 115 is disposed on top of seat back 105 and includes a bladder 120 enabling selective expansion as further explained herein. A gas channel 125 couples the pressurized gas in compartment 110 to bladder 120 through a breach valve 130. Breach valve 130 has a rupture point that is sufficient to contain the pressurized gas in compartment 110 in unloaded and lightly loaded situations. In the preferred embodiment, passenger protection system 100 further includes a charge valve 135 to control the quantity of gas (and ultimately the pressurization) of compartment 110 in the unloaded state.

Loading in the context of the present invention refers to an amount of force applied against seat back 105 from the passenger, such as during acceleration, falling back against seat back 105, and the like. Generally the loading is low and breach valve 130 remains closed. However, in response to a rear end impact, the loading is sufficiently great as the body of the passenger is forced against seat back 105 that the over pressurization collapses one or more walls of compartment 110 and ruptures breach valve 130. The over pressurization from this excess loading allows the over pressurized quantity of gas to be communicated through gas channel 125 to bladder 120. That communication of over pressurized gas operates on bladder 120 to expand headrest 115 to catch the head/neck of the passenger as it approaches headrest 115. The head/neck lags the body as the body is forced against seat back 105 and the timing/pressure levels of compartment 110 and rupture point of breach valve 130 control a timing of the expansion of headrest 115 to efficiently catch and cushion the head/neck as it is forced backward.

In passenger protection system 100, expansion of headrest 115 refers to an extension of all or a part of the outer perimeter forward towards the front of the vehicle (and in the direction from which the head/neck of the passenger is approaching seat back 105). A preferred embodiment of the present invention selectively expands headrest 115 predominately forward. One way to do this is to provide a furlable/unfurlable headrest 115/bladder 120. As shown further in FIG. 2, headrest 115 includes bladder 120 in a furled (i.e., spirally wound) mode.

Initially headrest 115 is in a first contracted mode (bladder 120 wound more tightly). In response to the increased loading from a rear end impact (shown as force arrow "1") against seat back 105, compartment 110 collapses and the over pressurization of the quantity of gas within compartment 110 ruptures breach valve 130 and applies an expansionary force (force arrow "2") to headrest 115. The expansionary force expands headrest 115 by unfurling bladder 120 (and in this configuration by fixing a center of spirally wound bladder 120, unfurling causes an outer layer of bladder 120 to move forward towards the passenger as the loading against seat back 110) and headrest 115 increases in distance from the fixed centerpoint. The unfurling/unwinding helps to restrain and protect the head of the passenger by smoothing deceleration using expanding headrest 115 responsive to application of a force arrow "3." The spiral winding and unwinding provide a natural springiness and cushioning to further help cushion and protect the head. Some embodiments will, like a conventional airbag, respond quickly enough that expansion of headrest 115 is complete before contacting the head/neck of the user.

In some embodiments, headrest 115 is adjustable in one or more different modes and is therefore not necessarily integrated into seat back 105 and includes independently adjustable features. In some instances, a height of headrest 115 above seat back 105 is adjustable. In which case gas channel 125 is included within a telescoping/extending structure. In other embodiments, an amount of unloaded spiraling of headrest 115 is adjustable to control the degree of pre-loaded expansion. In such a case, a memory material may be incorporated into furled bladder 120 so that an amount of pre-loaded expansion (a degree of winding in the contracted mode) may be set by the passenger and retained by headrest 115. The structure and arrangement of the memory material is sufficient to retain the degree of unloaded expansion while not appreciably interfering in expansion in response to the expansionary force. Of course some embodiments may include both types of adjustments or other types of adjustability.

While the preferred embodiments are shown and described in the context of beverage can technologies that employ aluminum and steel as materials, some embodiments may employ other materials that may be rigid, flexible, and collapsible as described herein. Passenger protection system 100 does not require use of electronics, sensors, or other arrangement for deployment or to inhibit unintended actuations. Passenger protection system 100 of the preferred embodiment includes an exclusively pneumatically actuated mechanical expansion of headrest 115 to help guard against passenger head/neck injuries potentially arising from a rear end impact. The mechanics of the actuation innately restrict actuation to rear end impacts and resist deployment arising from front and side impacts. Dangers associated with detonation and high-speed expansion of conventional airbags are reduced by use of relatively low pressures in compartment 110 and even the over pressurization applied to bladder 120 is not sufficient to expand headrest 115 too forcefully to increase danger to passengers.

The embodiments and discussion herein primarily references a gas, as in pressurized gas (e.g., air, inert gasses, and the like), gas channel, a quantity of gas, and the like. The present invention is not limited to uses of gas, but more generically may be implemented using many types of fluid. In this context, fluid is used in the sense of a substance that continually deforms (flows) under an applied shear stress. Fluids are a subset of the phases of matter and include liquids, gases, plasmas and, to some extent, plastic solids. Some adjustments to the expansion modality may be required for different types of fluids.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A passenger seat protection system for a seated passenger of a vehicle, comprising:
    a seat back supporting a pressurizable vessel storing a quantity of pressurized gas within a compartment, said compartment defined by one or more walls that collapse responsive to a force applied to said seat back by the seated passenger in a rear impact of the vehicle;
    a headrest including a bladder responsive to a gas pressure from said quantity of pressurized gas to transition an expansion of said headrest from a first expansion mode to a second expansion mode; and
    a gas channel communicating said quantity of pressurized gas to said bladder after a collapse of said one or more walls.

2. The passenger seat protection system of claim 1 wherein said bladder is furlable and unfurlable with said bladder furled when transitioning to said first expansion mode and said bladder unfurled in response to said gas pressure when transitioning to said second expansion mode from said first expansion mode.

3. The passenger seat protection system of claim 1 wherein said gas channel includes a valve disposed between said compartment and said bladder, said breach valve rupturing in response to said quantity of pressurized gas communicated to said gas channel.

4. The passenger seat protection system of claim 2 wherein said gas channel includes a valve disposed between said compartment and said bladder, said breach valve rupturing in response to said quantity of pressurized gas communicated to said gas channel.

5. The passenger seat protection system of claim 1 wherein said headrest is independently moveable with respect to said seat back and wherein said gas communication channel includes a telescoping channel providing a height adjustment to said headset with respect to a top of said seat back.

6. The passenger seat protection system of claim 2 wherein said headrest is independently moveable with respect to said seat back and wherein said gas communication channel includes a telescoping channel providing a height adjustment to said headset with respect to a top of said seat back.

7. The passenger seat protection system of claim 4 wherein said headrest is independently moveable with respect to said seat back and wherein said gas communication channel includes a telescoping channel providing a height adjustment to said headset with respect to a top of said seat back.

8. The passenger seat protection system of claim 1 further comprising a charging valve communicated to said compartment through said seat back to increase said quantity of pressurized gas.

9. The passenger seat protection system of claim 4 further comprising a charging valve communicated to said compartment through said seat back to increase said quantity of pressurized gas.

10. A passenger seat protection system for a seated passenger of a vehicle, comprising:
    a seat back supporting a pressurizable vessel storing a quantity of pressurized fluid within a compartment, said compartment defined by one or more walls that collapse responsive to a force applied to said seat back by the seated passenger in a rear impact of the vehicle;
    a headrest including a bladder responsive to a gas pressure from said quantity of pressurized fluid to transition an expansion of said headrest from a first expansion mode to a second expansion mode; and
    a fluid channel communicating said quantity of pressurized fluid to said bladder after a collapse of said one or more walls.

11. A passenger protection method for a seated passenger of a vehicle, the method comprising the steps of:
    a) collapsing a compartment in a pressurizable vessel supported by a seat back responsive to a force applied to said seat back by the seated passenger in a rear impact of the vehicle wherein said compartment includes a quantity of pressurized gas; thereafter b) communicating said quantity of pressurized gas to a bladder disposed in a headrest coupled to said seat back; and thereafter c) expanding said bladder responsive to said quantity of pressurized gas communicated from said collapsed compartment.

12. The passenger protection method of claim 11 wherein said bladder disposed within said headrest is furlable and unfurlable and wherein said expanding step c) includes unfurling said bladder responsive to said quantity of pressurized gas communicated from said collapsed compartment.

13. The passenger protection method of claim 11 wherein said communicating step b) includes communication through a gas channel coupling said compartment to said bladder, wherein said quantity of pressurized gas exerts a first pressure in said gas channel when said compartment is uncollapsed and exerts a second pressure in said gas channel as said compartment is collapsed, said second pressure greater than said first pressure, and wherein said gas channel includes a valve that is closed in response to said first pressure and that is open in response to said second pressure.

* * * * *